June 13, 1967 L. I. KAPLAN 3,324,655
GAS TURBINE ENGINE WITH CONTROLLABLE POWER OUTPUT
Filed July 9, 1963 3 Sheets-Sheet 1

INVENTOR.
LEO I. KAPLAN
BY
ATTORNEYS.

United States Patent Office 3,324,655
Patented June 13, 1967

3,324,655
GAS TURBINE ENGINE WITH CONTROLLABLE
POWER OUTPUT
Leo I. Kaplan, Los Angeles, Calif., assignor to Poly Industries, Inc., Pacoima, Calif., a corporation of California
Filed July 9, 1963, Ser. No. 293,603
22 Claims. (Cl. 60—39.16)

The present application is a continuation-in-part of my copending application for United States Letters Patent Ser. No. 121,449 entitled, Gas Turbine Engine With Controllable Power Output, filed July 3, 1961, and now abandoned.

The present invention relates to gas turbine engines and more particularly to an improved construction of this type featuring simple and easily operated means for varying the power output in accordance with requirements without adversely affecting the operation of the engine as a whole and also featuring a prime mover of this type having unique facilities for de-activating the drive to the load without resort to a clutch device or the like disconnect between the load and the output shaft of the engine as well as means for eliminating surging in the air compressor output despite operation under different turbine load conditions and unique means for introducing fuel into the combustion chambers.

More particularly, the present invention is directed to a gas turbine engine of the general type disclosed in my Patent 2,914,918, granted Dec. 1, 1959, disclosing a high efficiency gas turbine engine featuring serially connected combustion chambers arranged concentrically of one another between the turbo compressor unit and the power output turbine. The present invention incorporates various improvements over this earlier design and features, in particular, the use of simple easily controlled means for varying, in accordance with changing power demand requirements, the proportions of the compressed gases required to flow through the power output turbine without interfering adversely with the efficient operation of the turbo compressor, the combustion chambers proper or other components of the gas turbine.

It has been proposed heretofore to provide for variable power demands in a gas turbine engine by regulating the fuel supply to the combustion chambers while simultaneously throttling gas flow to the power turbine and bypassing the gases so throttled through a regulated passage circumventing the power turbine. Such a proposal is disclosed in United States Patent 2,473,356 granted to Rudolph Birmann and is subject to certain shortcomings and disadvantages sought to be avoided by the present invention. For example, the referred-to prior teachings require the use of two butterfly-type valves one of which is located in a large bore circular duct leading into the upstream side of the power turbine and the other of which is located in an equally large bore bypass conduit discharging into the downstream side of the power turbine. Engine power output is cut off by reducing fuel flow and closing the first valve while simultaneously opening the bypass valve until all gas flow has been routed around the power turbine. By this technique the large volume flow of hot gases is gradually transferred from a path through the turbine to a path through the bypass conduit making use of massive dual valve structures and a bypass conduit as large as the main turbine input conduit.

The present invention seeks to avoid the many problems characterizing the foregoing prior control expedient by providing simple, compact, easily operated, light weight and inexpensive pressure regulating means for regulating the effective pressure differential across the power turbine by bleeding gas past the turbine in the quantity required to obtain the desired power output and allowing the remainder of the hot gas to flow through the turbine without encountering interference, restrictions, obstructions or losses not experienced in normal full or substantially full power operation. It is found that this unique expedient of reducing the pressure drop across the power turbine by bleeding regulated quantities of either hot or cold gas or portions of both into the downstream side of the power turbine provides highly flexible, easily and infinitely variable control of the power output extending from no load to full load. Of particular importance is the fact that this mode of control is obtainable almost instantaneously, particularly when reducing the pressure differential by bleeding off cold gas with the fuel supply properly throttled. In connection with the foregoing, it is pointed out that, desirably, provision is provided for regulating the pressure across the turbine by bleeding gas into the downstream side of the turbine circuit from either the upstream or downstream side of the combustion chamber for the turbine, or partially from both sides as desired for most effective results under any given operating situation.

The significance of the foregoing will be readily recognized by persons familiar with the adverse starting load conditions of gas turbine engines and the sensitivity of rotary compressors to surging and pulsing under changing load and temperature conditions. The present invention is characterized by two highly important additional capabilities by reason of the regulatable bypass port or ports provided around the power output turbine. If one or more of these pressure regulating or bypass ports are open, controlled amounts of compressed air or gas are bypassed past the power turbine with the result that, during starting conditions for example, the only load imposed is that required to drive the compressor.

In addition and during normal operation of the engine, it is known that compressor performance is typically close to unstable conditions wherein pulsing, surging and the like inefficient flow conditions can occur. This is due in major part to the tendency of the air to back-flow if restriction to air flow increases beyond critical values as can easily occur because of high ambient air temperatures, or because of high operating temperatures internally of the engine. Compensation for these and other factors conducive to unstable compressor operation is provided in a simple and effective manner by this invention in the form of regulatable bypass port means for stabilizing compressor performance and the air handling capability of the engine without need for changing the turbine nozzles, the engine porting, or the compressor structure in any respect. Desirably two independent bypass port means are provided, one such means being sized at the time of engine manufacture to adjust the particular engine to a sired balanced condition for optimum performance under specified conditions. The second type of porting means is regulatable at will to vary the engine output between no load and full load output. It is also pointed out that the first or compensating port means may be provided with control means adjustable to accommodate the engine to changing climatic or other variables adversely affecting compressor stability and performance.

Coupled with the regulatable bypass means for the power output turbine are separate and independently regulatable fuel supplies for the two combustion chambers. The fuel supply control includes provision for operating either combustion chamber independently of the other or both chambers simultaneously under substantial and full load conditions. Because of the unusual flexibility of combustion chamber operation forming a feature of the invention taken together with the arrangement of these chambers relative to one another and other components of the engine, there is provided an engine of unusual flexibility and versatility.

For example, the engine is normally started using only the inner combustion chamber, the fuel requirements of this chamber being relatively small and the hot gases thereby produced being fully adequate to operate the engine at idling speed and to maintain the compressor in instant readiness to supply power output needs. Operation of the engine with only the inner combustion chamber functioning also serves to keep the surrounding outer combustion chamber preheated for more positive and instantaneous starting as soon as fuel is admitted. If only the inner combustion chamber is fuctioning, the relatively cold compressed air delivered by the compressor is not effective to drive the power turbine even though the bypass passages are closed. It is also pointed out that the fuel control system permits operation of the engine with fuel supplied only to the main combustion chamber when less than maximum power demands are being made on the engine. This mode of use achieves a considerable saving in fuel for normal mid-range power requirements and enables the operator to meet heavy power requirements simply by bringing the inner combustion chamber into operation.

Another characteristic feature of the present design is the fact that the products of combustion from both combustion chambers are required to discharge through the turbine drive means for the engine's air compressor. By virtue of this arrangement both combustion chambers and the power output turbine are maintained under pressurized conditions at all times irrespective of wide variations in engine load and even when the engine is operating without load. Owing to the separate and easily adjusted fuel supplies for the separate combustion chambers and to the provision of the simple means herein provided for controlling the output of the power turbine, the turbo-compressor assembly operates at high efficiency and is in instant readiness to respond to varying operating requirements with maximum speed and sensitivity.

Another feature of the design is the concentric relationship of the two principal combustion chambers to the end that these operate with maximum thermal efficiency at all times. During low or no load requirements of the output turbine all or the major portion of the turbo-compressor power requirements can be supplied by products of combustion generated principally or entirely within the inner combustion chamber.

Another problem attending the operation of gas turbine engines, and particularly troublesome under wide range power conditions, concerns the supply of fuel to the combustion facilities. Heretofore, costly precision fuel nozzles have been essential to introduce fuel in properly atomized condition into the fast flowing combustion air. Despite diligent efforts designers have been unable to provide a trouble-free design or one capable of using a wide range of fuels, or one not subject to malfunction by the presence in the fuel of foreign matter not easily removed by inexpensive filtering expedients.

This invention entirely avoids these and other vexing problems of prior fuel supply designs by providing an inexpensive fuel feeding system featuring a high temperature wicking assembly mounted directly in the combustion chamber and operating to dispense uniformly distributed fuel vapor into the air within the combustion chamber or flowing thereto and generated within the wicking from pressurized liquid fuel supplied to the wicking. The wicking proper is simple, easily constructed, inexpensive and of particular significance, usable with equal efficiency and nonclogging trouble-free effectiveness with both high and low grade fuels.

Still another feature is the provision of improved means for cooling the engine bearings as well as the hub of the compressor turbine runner. To this end compressed air is circulated over the turbo-compressor bearings as well as over the surface of turbine runner means driving the compressor. Heat dissipating fins applied to the bearing housing for the main power turbine are highly effective in cooling these bearings.

The gas turbine engine of the present invention is ideally suited for a great variety of prime mover power applications, whether of a stationary or nonstationary nature. Owing to the simplicity and ease with which the power output turbine can be activated and deactivated, there is no need for the usual clutch or the like disconnect between the turbine and the load proper. Instead, the function of the clutch is served in the present design by adjusting a simple valve mechanism functioning to route varying amouts of the products of combustion through the power output turbine to satisfy power requirements, and to bypass substantially all gas and products of combustion around the power output turbine under idling or no load conditions thereby rendering the latter ineffective to drive the load. Alternatively, and in striking contrast with the capabilities of conventional clutches, the present arrangement enables the operator to vary the power output of the engine over a wide range without ill effects of any kind upon the engine or the drive connections between the engine and the load. Thus there is no slippage between the parts under varying load or operating speeds with the result that the engine may be operated at partial power output for long periods without adverse effects. Disconnection of the power output turbine is also achieved by operating the fuel control to discontinue fuel flow to the outer or primary combustion chamber. This chamber then cools rapidly and ceases to supply gas adequately heated to drive the power output turbine. In this connection it is pointed out that a considerably smaller volume of compressed air is produced when the hot gas employed to drive the compressor is restricted to that produced by the inner combustion chamber.

Still another feature of importance is the use of a single stage centrifugal compressor having an axial flow inlet and an axial flow outlet as well as a shroud embracing the outer peripheries of its blades. By the use of a compressor of this type a high efficiency gas turbine engine is achieved of unusual compactness and of uniform exterior dimensions throughout its length.

Accordingly, it is a primary object of the present invention to provide a new and improved gas turbine engine of unusually simple and compact design featuring a direct positive driving connection at all times between the engine and the load and capable of being easily regulated between no load and full load output with minimum lag and with minimum interference with the overall engine operating efficiency.

Another object of the present invention is the provision of a motor vehicle featuring a gas turbine permanently connected to the driven wheels of the vehicle through a drive connection arranged to be regulated and contro'led by and in accordance with the production and flow of hot gases and products of combustion permitted within the engine and without restricting the size of the flow path to the power turbine.

Another object of the invention is the provision of unique means for unloading the engine during starting to the end that the compressor may be placed in operation expeditiously, efficiently and with a minimum of power.

Another object of the invention is the provision of a gas turbine engine having a plurality of combustion chambers arranged for operation selectively and independently of one another or in combination as desired under varying conditions including engine idling, various intermediate loads and maximum loading.

Another object is the provision of a gas turbine engine designed for starting under engine idling conditions and without need for operating the power output turbine or the main combustion chamber until there is need for power output from the engine.

Another object of the invention is the provision of a gas turbine engine characterized by the provision of simple and effective compensator means for maintaining the compressor in stable operation under changing conditions which would otherwise adversely affect compressor performance all without wasting pressurized gas from the engine to stabilize the compressor.

Another object is the provision of a gas turbine engine utilizing a turbo compressor in circuit with power turbine means and featuring adjustable means for regulating the back pressure on the compressor by bleeding a requisite quantity of gas to another interior and lower pressure area of the engine while maintaining the power turbine means in operation at full load.

Another object of the invention is the provision of a simple, high efficiency gas turbine engine having simple, easily adjusted means for varying the proportion of hot gases flowing through the power output turbine means thereof by varying the relative upstream and downstream pressure ratios on the inlet and outlet sides of the turbine.

Another object of the invention is the provision of an improved gas turbine engine regulatable over its full power range in response to bleeding small but variable portions of the upstream gas flow around the power turbine without restricting the size of the main flow path to and through the power turbine.

Another object of the invention is the provision of simple, instantly responsive power output control means for a gas turbine engine provided with a main hot gas generating chamber and featuring bleeder valve means for regulating the pressure differential across the power turbine and effective to bypass hot and cold gas selectively and in any desired proportion from axially spaced portions of the hot gas generating zone past the power turbine and into the pressurized gas stream on the discharge side of the power turbine.

Another object of the invention is the provision of a unitary gas turbine engine assembly having a power output turbine free of connection with the turbo-compressor unit and featuring easily controlled means regulating the proportion of hot gases en route to the turbo-compressor unit and constrained to flow through alternate passages some of which include the power output turbine and some of which exclude the latter turbine.

Another object of the invention is the provision of an improved method of generating power and controlling the useful output thereof.

Another object of the invention is the provision of an improved compact gas turbine engine having a power output shaft free of any connection with the turbo-compressor unit of the engine and featuring, in addition, means for varying the power output of the engine over a wide range while maintaining the operating efficiency of the turbo-compressor at a high level.

Another object of the invention is the provision of a gas turbine engine having means for activating and de-activating the power turbine thereof while maintaining the air compressor in operation under substantially the same conditions prevailing during normal load conditions.

Another object of the invention is the provision of a gas turbine engine having an output turbine supported for rotation independently of the turbo-compressor shaft together with means for activating and de-activating the power turbine without materially altering the pressure of air delivered to the engine by the turbo compressor.

Another object of the invention is the provision of a high temperature vapor generator adapted to be located interiorly of a hot gas generator for a gas turbine engine.

Another object of the invention is the provision of a combined flame holder and means for dispensing fuel into the combustion chamber of a turbine engine.

These and other more specific objects will appear upon reading the following specification and claims and upon considering in connection therewith the attached drawings to which they relate.

Referring now to the drawings in which a preferred embodiment of the invention is illustrated.

Figure 1:
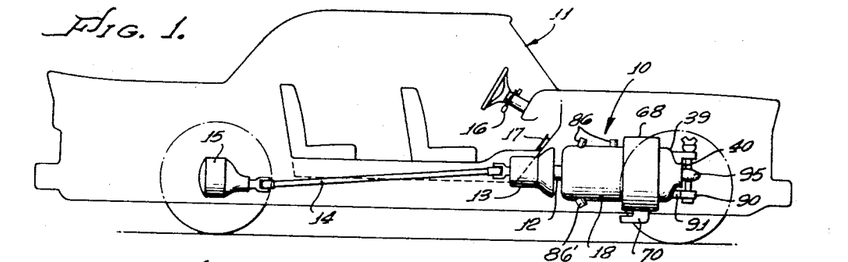
FIGURE 1 is a generally schematic view of an engine according to the present invention shown directly and positively connected to a typical load such as the differential of a wheeled vehicle.
Figure 2:
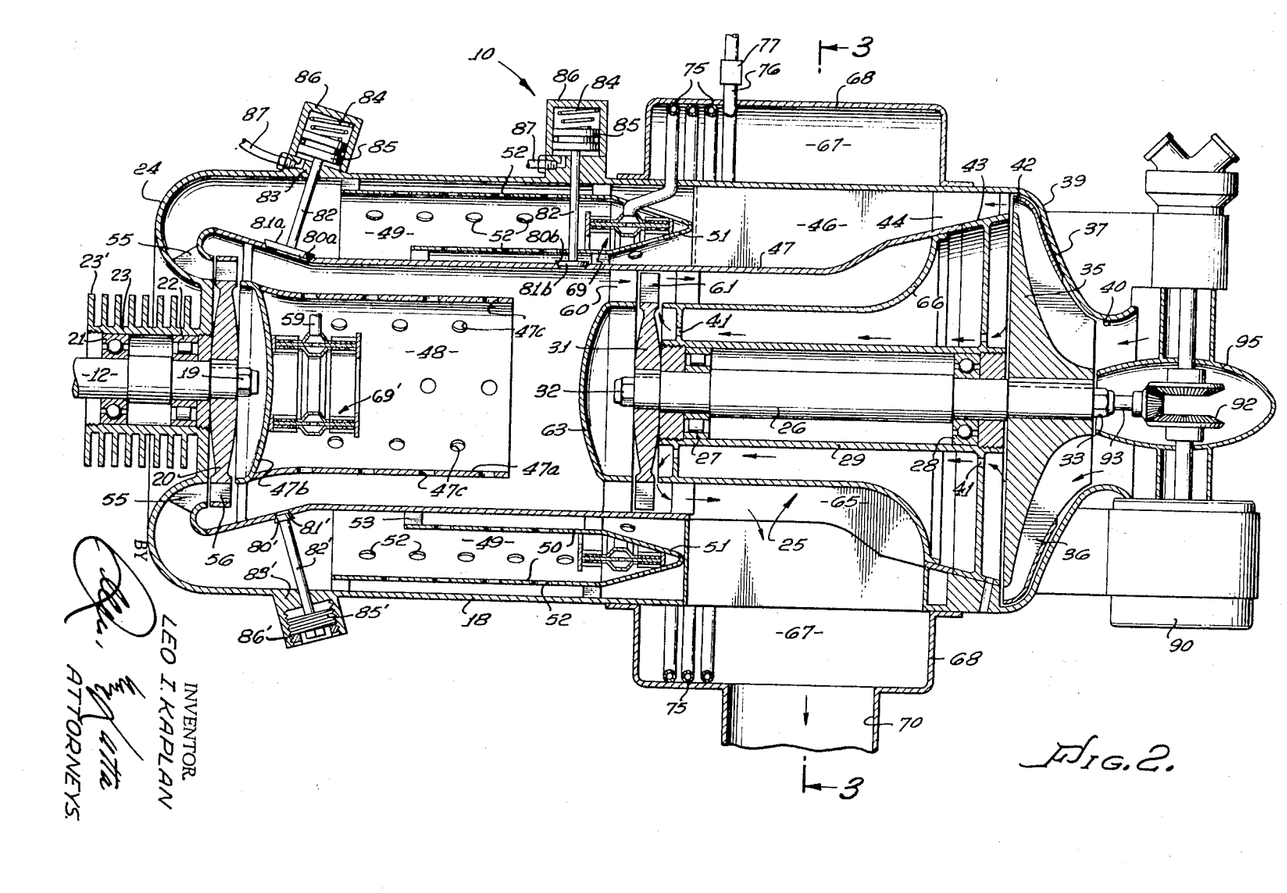
FIGURE 2 is a longitudinal sectional view on an enlarged scale through the engine proper showing the parts positioned for full power output.

Referring more particularly to FIGURES 1 and 2 there is shown a preferred embodiment of the present invention wherein a gas turbine engine, designated generally 10, is shown supported in a suitable manner in the engine compartment of a vehicle 11. The power output shaft 12 of engine 10 is connected through suitable speed reduction means 13 to conventional drive shaft assembly 14 connected through the usual differential 15 with the rear axles of vehicle 11. It is pointed out and emphasized that a clutch is not required and that movement of the vehicle is controlled by manipulation of a suitable forward and reverse drive control 16 forming part of the speed reduction means 13 and by suitable foot or manually controlled means 17, 17' for controlling respective by-pass valve means to be described presently and associated with the power output turbine 20 of engine 10. Additionally, an alternate or supplemental control selectively usuable along with or independently of means 17, 17' comprises manually controlled valve mechanism 110 for the engine fuel supply is effective in the efficient control of engine operation and power output as will be explained in detail below.

Referring now more particularly to FIGURE 2, it will be understood that turbine engine 10 comprises an elongated cylindrical outer housing 18. Fixedly secured, as by nut 19 to its output shaft 12, is one or more runners 20 of a reaction or impulse turbine constituting the power output turbine of the engine. Shaft 12 is suitably supported by anti-friction bearings 21, 22 at the opposite ends of a supporting hub 23 projecting axially from the toroid shaped end cap 24 for the left hand end of engine housing 18, as viewed in FIGURE 2.

Since bearings 21, 22 are closely adjacent the hot power turbine, provision for cooling these is highly desirable and is accomplished by heat radiating fins 23' integral with or bonded to hub 23. The generally vertical disposition of these fins facilitates circulation of cooling air past the fins by convection. Air scoop means can also be used advantageously to provide forced air circulation.

Concentrically supported within the right hand end of engine housing 18 is a turbo-compressor assembly designated generally 25. This assembly includes a shaft 26 which is shown as aligned with and operatively dissociated from engine output shaft 12. However, it is to be understood that these two subassemblies need not be aligned but in fact may be disposed in any desired nonaligned relationship. The opposite ends of shaft 26 are supported in bearing assemblies 27, 28 mounted at the opposite ends of a tubular housing 29. A turbine drive runner 31 is held assembled to the left hand end of this shaft by a nut 32. Similarly secured by nut 33 to the opposite end of shaft 26 is a centrifugal-type compressor impeller 35 having radially disposed blades 36. Preferably the impeller is so designed that the velocity of air passing along the passages thereof continually decelerates as it passes therealong to the point of discharge into diffuser 44. The outer radial edges of blades 36 are rigidly secured to and closed by an annular shroud 37, which is highly effective in reducing friction and other losses of air undergoing compression. Shroud 37 encloses the major portion of the blades and particularly the discharge end thereof where the direction of air flow is being directed to flow axially along the interior surface of cylindrical housing 18 of the engine and into the outer combustion chamber. As will be appreciated, except for shroud 37, the rapidly flowing air undergoing compression would be flowing through a long spiral path in direct contact with the inner surface of end cap 39. The shrouded impeller employed in the present invention avoids these high friction and turbulence losses and accounts in large measure for the high performance of the air compressor and the fact that a single stage centrifugal compressor meets the air requirements of the engine disclosed herein. By employing an impeller diameter substantially as large as the outer shell of the engine, it is feasible to drive the compressor at lower speed.

The circular webs supporting the bearing for the opposite ends of turbo compressor shaft 26 are provided with a ring of closely spaced air ports 41, 41 which serve to pass a sufficient quantity of cool air to cool bearings 27, 28 as well as the hub of turbine runner 31. This cooling air is bled from the discharge rim of the compressor impeller, through ports 41 closely beside bearing 28 to cool that bearing, thence along housing 29, through the ring of ports 41, adjacent bearing 27 and then radially across the surface of turbine runner 31 and into the gases discharging from the blades of this runner. As will be recognized, the degree of cooling is controlled primarily by the flow of cooling air permitted by the size and number of bleeder ports 41.

The right hand end of housing 18 and the compressor rotor in particular are enclosed by an end cap 39 having a streamlined air intake end 40 opening axially of the engine. The larger diameter outlet end of end cap 39 is secured to engine housing 18 in any suitable manner and cooperates therewith in directing the compressed air axially of the engine.

It will be understood that compressor impeller 35 discharges axially of the engine, as is indicated at 42, into a stationary diffuser ring 43 provided with the usual stationary diffuser blades 44 of well known appropriate design. The latter serve to effect the efficient transition of the air from discharge passages 42 of compressor impeller 35 into the annular chamber 46 lying immediately inside the right hand end of housing 18. The outer wall of chamber 46 is formed by housing 18 whereas its inner inner annular wall is provided by a sheet metal shell 47 substantially coextensive in length with outer housing 18 and serving to divide the inner or secondary combustion chamber 48 from the outer or primary combustion chamber 49.

Important advantages and increased efficiency is obtainable by arranging combustion chambers 48 and 49 concentrically of one another intermediate turbo-compressor assembly 25 and the power output turbine here represented by runner 20. The two combustion chambers will, therefore, be recognized as separated from one another by the intervening common cylindrical shell 47 of heat conducting material and by a perforated liner shell 47a suitably secured to the shield or cap 47b for turbine runner 20. It will be understood that shell 47a is not essential and may be dispensed with if desired particularly if suitable flame holding means are present for the secondary combustion chamber.

There is preferably disposed within the outer or primary combustion chamber 49 a so-called basket formed by a pair of annular shells 50, 50 interconnected at their right hand ends by an annular ring 51 of conical shape in cross-section, the walls of these shells each preferably being provided with a large number of air inlet openings 52 in accordance with customary practice. Shells 50, 50 are suitably supported concentrically of shells 18 and 47 as by means of radially disposed spacer struts 53. The spacing of walls 50 from walls 47 and 18 permits compressed air to pass freely along the outer side of these walls to provide desirable heat insulation with part of the air entering chamber 49 through openings 52, and part flowing past this chamber and into secondary combustion chamber 48.

Hot products of combustion and unconsumed combustion air normally exhaust from primary combustion chamber 49 and through the toroidal return bend annulus formed in end cap 24 and through nozzles provided by an appropriately designed annular row of blades 55. Blades 55 direct the hot products and unconsumed compressed air against blades 56 of power turbine 20. The unburned air entering the annular space between tubular shell 47 and liner 47a flows in large part through openings 47c into secondary combustion chamber 48 and mixes with fuel drawn into the fast flowing products from the centrally disposed fuel supply pipe 59 fitted at its end with a fuel dispensing wick assembly 69'. This fuel is consumed within chamber 48 and the resulting products of combustion along with those entering from primary chamber 49 then flow through nozzles 60 against blades 61 of turbine runner 31 to drive compressor impeller 35. Nozzles 60 are here shown as mounted between shell 47 and a shroud cap 63 positioned opposite the left hand end of runner 31 in the manner clearly shown in FIGURE 2.

The low pressure products of combustion discharging axially to the right from blades 61 of runner 31 enter the left end of a series of passages 65. These passages are formed by a ring of long flat tubes 66 disposed radially about the midportion of turbo-compressor 25 and best understood from FIGURES 2 and 3. Tubes 66 extend through openings in annular shell 47 and their long narrow outer ends open through engine housing 18 into a chamber 67 formed by a ring-like housing 68 suitably secured to the engine housing.

Figure 3:
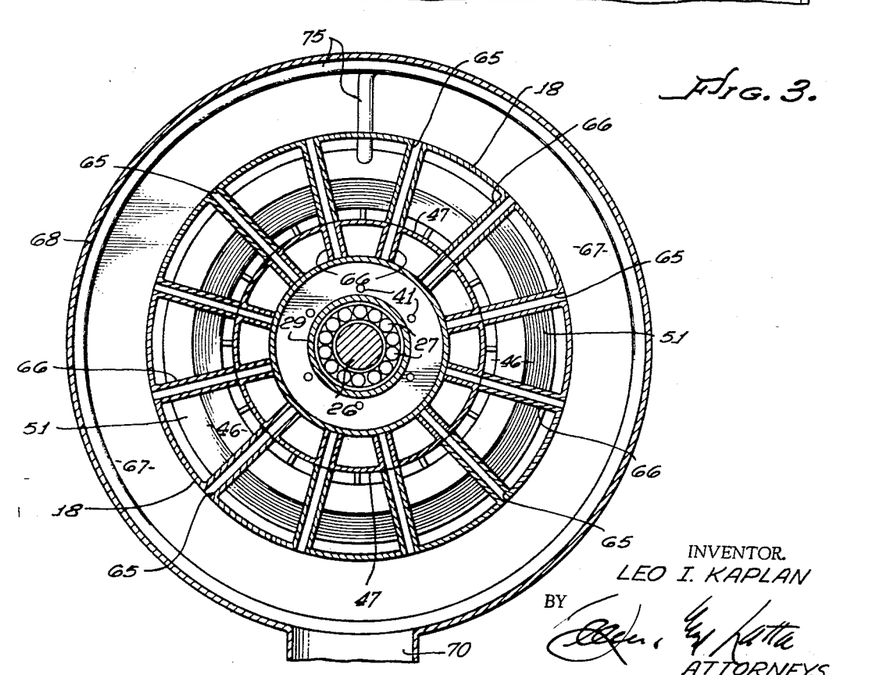
FIGURE 3 is a cross-sectional view taken along line 3—3 on FIGURE 2 showing construction details of the heat exchanger utilizing the exhaust products of combustion to preheat compressed air en route to the combustion chambers.

From the foregoing it will be recognized that the hot gases, in passing through tubes 66, give up a major portion of the heat therein to the relatively cool compressed air flowing about the exterior surfaces of these tubes en route from compressor outlet 42 to the two combustion chambers 48, 49. Additional heat exchange with the compressed air occurs as the exhaust gases flow through chamber 67 toward outlet duct 70.

Also preferably located in chamber 67 are several convolutions of a fuel supply pipe 75 having its outer end 76 connected via a suitable pressure regulator 77 to a source of fuel for the engine such as kerosene, diesel oil, or any other suitable fuel of which any unusually wide types and grades can be used with excellent results. The discharge end of fuel pipe 75 extends into a specially constructed high temperature wick device and flame holder designated generally 69. Although not so shown, it will be understood that fuel distributing pipe 59 for secondary combustion chamber 48 may also have its inlet end in communication wtih the fuel preheating coil 75.

Figure 6:
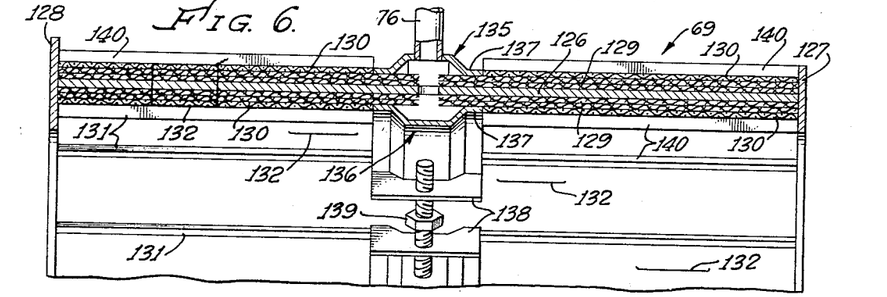
FIGURE 6 is a fragmentary longitudinal sectional view through one of two similar wick devices employed in each of the combustion chambers.

The combined flame holder and fuel distributing wick devices 69, 69' are illustrated in all essential respects in FIGURE 6. This device is generally cylindrical and has a cylindrical sheet metal main body 126 capped at its upstream end with a relatively narrow ring 127 and at its downstream end with a similar but wider cap ring 128, all suitably secured together as by welding. Snugly wrapped against the inner and outer surfaces of cylinder 126 are multiple layers 129 of high temperature wicking such as quartz or glass fibers suitably intertwined as by felting or weaving the same into a fabric. This wicking material formed of a multiplicity of glass or quartz filaments is found to provide a highly effective wick operating to distribute a large volume of liquid fuel over a wide surface area directly in the combustion chamber and fully exposed to the heat thereof.

The wicking proper is held in assembled position against cylinder 126 in major part by a wrapping of stainless wire mesh 130 reinforced and stiffened by attached strips of metal 131 and secured to main body cylinder 126 by staples, wire ties or the like 132 passing through perforations in the body cylinder. The wicking is additionally held against cylinder 126 by inner and outer fuel distributing split ring members 135, 136, respectively, of similar construction but having oppositely contoured cross-sections of the type best shown in FIGURE 6. Each has a wide interior flow channel the side walls of which have axially and oppositely flaring lips 137. The adjacent ends of these ring members overlap and are provided with radial lugs 138 and threaded clamping devices. The outer ring 135 is equipped with a clamping device, such as an ordinary nut and bolt, by which this ring can be contracted with its lips compressing the wicking against main body cylinder 126, whereas inner ring 136 is equipped with a threaded adjuster 139 having left and right hand threads and operating when rotated to expand ring 136 thereby compressing wicking 129 against the interior surface of cylinder 126.

Since it is desirable to supply pressurized fuel to the liquid distributing channels extending along the interior of rings 135, 136 to assure uniform and thorough distribution through all parts of the wick as well as for flushing away sediment and foreign particles, it is important that lips 137 of the rings compress the wicking sufficiently to prevent escape of fuel past the lips except along and through the wick itself. Proper tightening of rings 135, 136 is found to provide a fully satisfactory seal meeting the functional requirements just discussed as well as reliable means controlling uniformity of fuel distribution into the wicking. Additional control if needed can be had by varying the surface area of contact between the wick and the fuel interiorly of the clamping rings 135, 136, it being well known that flow along a wick can be easily varied by varying the surface area of the wick submerged in or contacted by the liquid.

It will be understood that wick device 69' for the smaller secondary combustion chamber 48 is identical with wick 69 except for size.

Referring more particularly to FIGURE 2, it is pointed out that a most important feature of the invention resides in the provision of controllable bypass means including bleed port means for bleeding or bypassing regulated portions only of the pressurized gas in a path bypassing the power output turbine 20 or through an alternate path bypassing both this turbine as well as both combustion chambers. These bleeder port and bypass facilities have multiple functions and purposes as will be explained in greater detail below following a description of suitable structural embodiments of the means referred to.

As herein shown, the bleeder or bypass means is shown located at the opposite ends of the two combustion chambers 48, 49 as viewed in FIGURE 2, but it is to be understood that these passages or ports may be located elsewhere within the principles of this invention. The port or ports functioning primarily to compensate for unstable compressor operating conditions may be located at any point downstream from the discharge of the compressor. The heat present in the air or gas bled therethrough is utilized in some downstream component of the engine rather than being wasted to the atmosphere as proposed heretofore. However, in the preferred embodiment, and as herein illustrated, all bleeding and bypassing of compressed gas is into the inner or preheating combustion chamber 48 for beneficial use in supplying power required for auxiliaries of the engine, as for example, to drive turbine 61 connected to the compressor. To this end, annular shell 47 separating combustion chambers 48 and 49 is provided with one or more bypass openings 80a, 80b. As herein shown, there are two such openings 80a and 80b disposed generally at the opposite ends of the inner combustion chamber 48.

This arrangement of the power control valves 81a, 81b provides a wide range of flexibility in performance and operating characteristics since the operator is enabled to spill any desired relative proportions of either hot or cold gas from the upstream side of the power turbine. While heretofore it has been thought essential to cut off or restrict flow to and through the power turbine to regulate its power output in an effective and reliable manner, this invention has disclosed this to be unnecessary and to involve needless complications. Thus, the bleeder devices of this invention are, in effect, adjustable pressure regulators for varying the effective pressure differential across the turbine to be regulated. Only that portion of the gas need be bled around the turbine being controlled required to provide the desired change in its power output, the remainder of the gas continuing to flow in the normal flow passage without need for changing the size or flow characteristics of this latter flow passage. It will therefore be recognized that this novel principle as herein applied permits one to achieve full range power control without change of any kind in the main and normal gas flow channels and by use of a bleeder control having a maximum flow capacity substantially less than that of the normal main passage. Substantially greater reductions in the size of the bleeder facilities are feasible by sacrificing the capability of each bleeder to provide full range control of the power output; in other words, by making them so small that partial opening of both bleeders is necessary to achieve full power cutoff. Maximum deceleration is achieved by opening port 80b to bleed relatively cold fuelless air into the discharge end of inner combustion chamber 48. This cold air is of little avail in driving the compressor turbine with the result that the compressor performance falls off to a marked degree thereby further reducing the volume of air supplied to the engine by the compressor.

Bypass ports 80a, 80b are arranged to be closed by any suitable flow regulating means, as for example, poppet type valves 81a, 81b having stems 82 reciprocally supported by appropriate structures such as bosses 83 and an associated operating piston 85 and piston housings 86 mounted on engine housing 18. As here shown, valves 81a, 81b are normally urged closed by compression springs 84 encircling stems 82 with one end bearing against the outer end of housings 86 and the other end bearing against pistons 85. Pistons 85 have a fluid-tight seal with the interior of cylinders 86 and are arranged to be operated in opposition to springs 84 under fluid pressure supplied through tubing 87 leading to actuating control means to be described in detail presently.

Preferably, there is also provided a trimmer or compensator port 80' here shown as disposed at the lower rear end of the engine and serving as a separately controllable bleeder port for bleeding pressurized fluid from the discharge end of the compressor into some lower pressure portion of the engine having use for the available energy and as necessary to trim the compressor and render it stable. Although it is not necessary, bleeder port 80' is here shown as provided with controllable valve means 81' and an externally accessible finely regulatable control means therefor such as that illustrated in FIGURE 2. As there shown, an enlargement on the outer end of valve stem 82' is threaded and mated with threads internally of housing 85'. The port or ports 80' may be relatively small since the purpose and function of these is to bleed air from the passage in direct communication with the discharge of the compressor to reduce the pressure of this fluid sufficiently to prevent surging, pulsing and unstable operation of the compressor.

As is well known to those familiar with compressor design and operation, if the pressure in the discharge passage of the compressor rises above a critical value there is a tendency for a backflow of air which gives rise to pulsing, surging, vibration and a decrease in the operating efficiency of the compressor. In fact it is not uncommon for the compressor to become partially inoperative and/or for serious vibration conditions to arise. Such conditions can occur under various operating conditions including varying temperature conditions in the combustion chamber, varying output loads on the power turbine, and high air temperatures of the air entering the compressor and others.

By applying a tool to the non-circular outer end of valve stem 82' valve 81' can be adjusted to a fine degree and as necessary to stablize each individual engine and its compressor and maintain the compressor at peak operating efficiency free of surging, pulsing and unstable operation under idling and all power output conditions.

It is also to be understood that this invention includes the concept of drilling small bleeder ports similar to ports 80' in the wall of the housing leading high pressure fluid from the compressor discharge to a point of use, such drill ports having the necessary area required to compensate for the same conditions as valve 81', namely, variations in the manufacturing tolerances or performance characteristics of a particular operating environment for the compressor. For example, if it is found that a particular completed assembly delivers compressed fluid at a slight excess pressure tending to cause surging or pulsing or the like unstable condition in the compressor, then the assembly may be rendered stable merely by providing a small bleed port of the requisite size for wasting excess fluid to the exterior of the engine.

Figure 4:
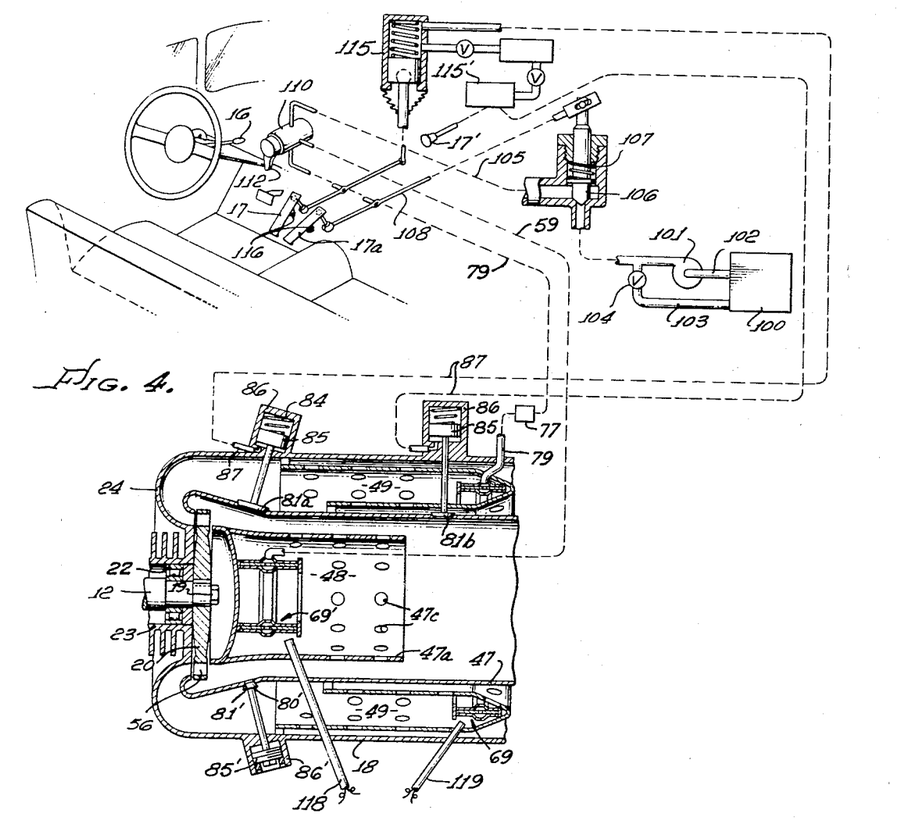
FIGURE 4 is a diagrammatic showing of a preferred embodiment of the fuel and power control mechanism.
Figure 5:
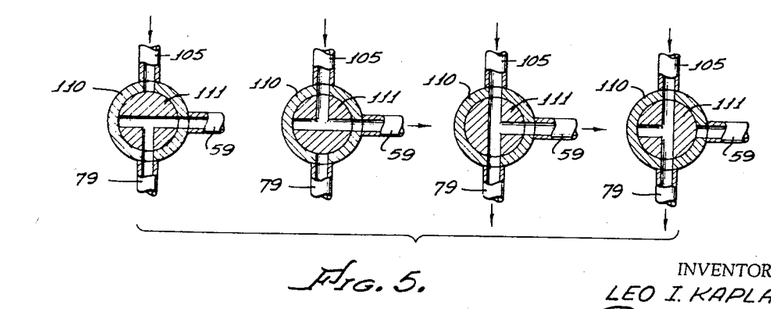
FIGURE 5 is a diagrammatic view of the manually controlled fuel valve in its four principal positions.

Referring more particularly to FIGURES 4 and 5 there is shown diagrammatically one suitable control arrangement for the described gas turbine engine. Fuel stored in a suitable tank 100 is connected to a pump 101 by conduit 102. Desirably, the discharge side of the pump is connected by a conduit 103 and a suitable pressure relief valve 104 to the tank in order that fuel in excess of actual requirements is returned to the tank while assuring a constant pressure on the fuel flowing to the engine from the discharge side of the pump. The pressurized fuel line 105 includes an adjustable needle valve 106 urged toward closed position by spring 107. Needle valve 106 is connected through a suitable operating lever means 108 to an accelerator pedal 17a located closely beside accelerator pedal 17 controlling the position of bypass valve 81a in engine 10 and the hand operated member 17' being similarly operable to control bypass valve 81b. After the fuel passes needle valve 106 it continues through conduit 105 into manually-controlled three way valve 110 conveniently mounted adjacent the operator, as on the dashboard of vehicle 11.

Manually-controlled valve 110 is provided with a rotary plug 111 having an operating handle 112. Plug 111 is provided with the usual three-way intersecting passages variously rotatable, as is indicated in FIGURE 5, into registry with conduits 59, 79 leading respectively to the primary combustion chamber nozzle 59 and to the primary combustion chamber nozzles 79. As is evident from FIGURE 5, plug 111 can be adjusted to regulate the fuel supply to either combustion chamber as well as to regulate the fuel supplied simultaneously to both chambers, plug 111 and the cooperating valve body 110 being merely representative of various types of valves well known in the valve art and suitable for use in accomplishing the purposes of this invention. From the foregoing it will be understood that accelerator pedal 17a is operable to adjust needle valve 106 to regulate the quantity of fuel flowing to the engine whereas manual valve 110 is adjustable to one of three operating positions to permit fuel flow to either burner or to both. Thus valve 110 has four principal positions each of which is illustrated in FIGURE 5. When the valve is in the position shown in the upper diagram, no fuel can flow to either combustion chamber. If the valve plug is rotated 180 degrees, fuel flows only to the secondary or re-heat combustion chamber 48. If the valve plug is rotated 90 degrees clockwise from the last mentioned position then it will be understood that fuel flows to both the primary and secondary combustion chambers. And lastly, if the valve is rotated clockwise 180 degrees from the last described position, fuel is supplied only to the outer or primary combustion chamber 49.

It should also be pointed out in connection with FIGURE 4 that the other control pedal 17 is arranged to actuate a master hydraulic cylinder 115 connected through conduits 87 with the outer ends of actuating cylinder 86 for the bypass or unloading valve 81a. Likewise hand control 17' will be understood as effective through an identical device 115' to open and adjust the alternate bypass valve 81b. A suitable compression spring 116 underlies hand control 17' and both accelerator pedals and normally urges each to their respective extended positions wherein valves 81a and 81b are closed. Operation of the valves operatively connected with each is effected by depressing the associated control 17' or either or both accelerator pedals 17, 17a.

It is further pointed out that each of the combustion chambers is provided with suitable igniter means for initiating operation such as glow plug igniters 118 and 119. Igniter 118 has its active end positioned to ignite fuel present in wick 69' whereas the active end of igniter 119 is similarly positioned with respect to fuel present in wick 69.

In concluding the detailed description of one typical embodiment of the invention engine it will be understood that an engine suitably designed to propel a conventional passenger automobile and rated at 180–200 horsepower is provided with bypass port facilities bearing important relationships to the areas of the respective inlet nozzles or ports of the two turbines. In general, all bypass ports designed to control the power output of the power turbine throughout its full load range should have a flow cross-section greater than inlet nozzles 55 of the power turbine and equal to or slightly greater than the total area of inlet nozzles 60 of turbine 61 driving the air compressor. For practical purposes a bypass port area intermediate that of the two turbine inlets provides for full range power control as this bypass capacity taken with normal losses serves to bypass as much gas past the power turbine as can be accommodated by the inlet nozzles to the compressor turbine and results in zero pressure differential across the power turbine. Under these conditions there is no flow through the latter and consequently no power is produced by the power turbine.

Usually it is desirable that the two sets of bypass valves at the opposite ends of the two combustion chambers each be large enough to provide full range power control to the end that each alone can be used for this purpose. In this case, simultaneous use of both sets of valves provides assurance of excess and instantly responsive power control capability. Although only single valves 80a and 80b have been shown in the drawings, it will be understood that two or more of each are desirably present—particularly in all except small capacity engines, and these are appropriately distributed about the circumference of the engine. Irrespective of the number used, the total capacity of the ports controlled need not exceed the proportions set forth above since the maximum useful capacity is the flow capacity of the compressor turbine nozzles 60. In an engine of 180–200 horsepower, one might use, by way of example, a power turbine nozzle area of say 2.5 square inches and a compressor turbine nozzle area of 5 square inches. In this case each set of hot gas bypass valves 80a could be provided with a port area of not substantially in excess of 5 square inches, and the same size for the area of ports 80b. The bypass ports need never be larger than the area of ports 60 because there is never need for bypassing more gas than can flow through the downstream ports 60. However, it will be quite apparent that this maximum bypass port size is many times smaller than the size of the engine flow passages generally, and particularly those leading to and from the bypass ports. For this reason all problems associated with the use of valves to control engine power by bypassing regulated quantities of gas around the power turbine are greatly minimized as is the control of these valves.

Another feature to be mentioned in concluding the detailed description is the fact that conventional fuel supplies designed to introduce fuel into the combustion chamber of gas turbine engines must operate at high pressures and not infrequently in the range of 600–700 p.s.i. These high pressures involve problems, design requirements and disadvantages well known to those skilled in this art. The fuel dispensing wicking of this invention avoids the numerous problems inherent in the use of such high pressure spray nozzles in that pressures only slightly above the compression ratio pressure is required since this is adequate to permit saturation of the wicking by capillary action from the constant liquid supply maintained interiorly of channel-shaped fuel distributors 135, 136 (FIGURE 6). In the engine here disclosed, a fuel pressure not in excess of 50 p.s.i. is entirely adequate, it being borne in mind that it must always slightly exceed the particular internal pressure of the respective combustion chambers or else liquid cannot reach the wick devices.

*Operation and control of the engine*

The mode of starting and operating the described gas turbine engine will now be reviewed to convey a better understanding of its unusual versatility and flexibility of operation. To start the engine, the operator energizes pump 101 to establish an operating pressure in fuel line 105 leading to the regulatable needle valve 106. He also closes the electrical circuit to igniter 118 and energizes starter motor 90 to drive air compressor rotor 35 via gearing 92 and shaft 93 enclosed by housing 95 and supply compressed air to the engine. This air flows through the outer concentric chamber housing the primary combustion chamber 49. Preferably, during starting bypass valve 81a is held open by depressing control pedal 17 allowing part of the compressed air to flow through port 80a and directly into secondary combustion chamber 48 and another portion to pass through power turbine runner 20. Once this air flow is established the operator depresses accelerator pedal 17a to open needle valve 106 and manipulates handle 112 of the manual valve 110 to a position supplying fuel only to inner smaller wicking 69' by way of conduit 59. This fuel is ignited by plug 118 and soon provides a supply of hot pressurized gas to operate turbine 61 driving air compressor 25 whereupon starter motor 90 may be de-energized.

The engine may continue to operate in this manner under idling conditions and with only the inner burner operating until there is a need for useful power from turbine 20. In the meantime the hot gases issuing from turbine 61 driving the compressor flow through heat exchanger passages 65 thereby pre-heating the compressed air en route to primary combustion chamber 49, the hot gases flowing about passages 65 and into annular chamber 67 containing the fuel pre-heater coils 75.

During engine idling conditions with only inner combustion chamber 48 in operation, little or no useful power is supplied to the load by power turbine 20 since the open condition of bypass valves 81a results in an inadequate pressure differential across the power turbine to drive it. It will be understood that during engine idling operation waste heat from inner combustion chamber warms the outer combustion chamber and the engine generally as the compressor accelerates towards its normal high operating speed. Accordingly, upon the supply of fuel to the primary combustion chamber through wicking assembly 69 and the partial or full closure of bypass valve 81a, the engine is in instant readiness to start to provide power from turbine 20. If power production is desired as quickly as possible, operation of the primary combustion chamber may be initiated along with or shortly following activation of inner chamber 48.

In connection with the foregoing it will be understood that initiation of combustion in outer chamber 47 is preceded by the operator shifting manual valve 110 to the position shown in the third diagram of FIGURE 5 to supply fuel to both chambers 48 and 49.

When operating under the conditions last described the power output of the engine is controllable selectively and at the operator's option in any of several different manners. For example, assuming that fuel is flowing at normal rate to both combustion chambers, the power output of the engine is controllable in increments of any desired size by depressing accelerator 17 or control 17', or both, to position bleeder valves 81a, 81b as required to provide any desired power output. As will be apparent, the power output of turbine 20 will be dependent upon the proportions of the hot pressurized gases passing through the turbine relative to those shunted past this turbine by valves 81a, 81b. Thus, when valves 81a, 81b are fully open turbine 20 is ineffective to deliver power to the load whereas in intermediate adjusted positions of these valves, the turbine is effective to deliver power to the load at a speed and in an amount depending primarily on the adjusted position of these valves and the amount of fuel delivered to the primary and secondary combustion chambers. If the valves are fully closed as shown in FIGURE 2, then the power developed by turbine runner 20 is dependent upon the fuel admitted to the two combustion chambers.

The advantages attending the use of valve 81b to control power output have been referred to above and need not be repeated save to mention that both serve to route gases around the turbine to control its output but valve 81a assures a flow of all gas through both combustion chambers, whereas valve 81b routes relatively cold air free of fuel vapor past the turbine and both combustion chambers. It will therefore be appreciated that a change in power output, particularly in deceleration, is obtainable substantially instantaneously by manipulating the latter valve.

Alternatively, the power output is controllable by closing valves 81a, 81b and adjusting the position of accelerator pedal 17a to control needle valve 106 and thereby the quantity of fuel flowing to the respective combustion chambers. Further control is provided by adjusting the position of manual valve 110. Still another control mode involves regulation and control of all valves and of both pedals 17 and 17a.

Under operating conditions wherein full power output of the engine is not required, it is customary to position manual valve 110 so that fuel is supplied only to the main or primary combustion chamber 49, no fuel being supplied to inner chamber 48. Under these conditions the power output is less than the maximum available power and the hot gases discharging from the power turbine continue straight through the inner chamber and into nozzles 60 to energize the compressor driving turbine 61 following which these spent gases pass in heat exchange with the compressed air flowing to the primary combustion chamber. Variation in the speed of vehicle 11 is then achieved by adjusting accelerator 17a to vary the position of the fuel rate control valve 106; alternatively, accelerator 17 can be operated to adjust the open position of bypass valve 81a. Immediately upon need for extra power, the operator shifts manual valve 110 to a position supplying fuel to both combustion chambers.

As will be recognized from the foregoing, the engine performance characteristics are unusual both as respects their range, flexibility and variety. Power response is particularly unique and attainable in a very brief period because of the provision of the inner combustion chamber which permits the use of all initially available energy to drive the turbo compressor thereby to accelerate this unit to partial or full speed as desired very quickly and efficiently. Simultaneously, or in time delay relation, the primary combustion chamber can be placed in operation with the result that high power output is available almost instantly simply by adjusting bypass valves 81 toward closed position. The only lag in power response is that slight amount associated with the acceleration of the low inertia power turbine runner. Almost instant speed response is obtainable through adjustment of the easily and finely adjustable bypass valves. Wide range but considerably slow speed response is also attainable by adjusting the fuel rate by means of needle valve 106 and accelerator 17a.

It is pointed out and emphasized that all air entering the engine flows through the heat exchanger as well as through both the primary and secondary combustion chambers and thence through the turbine driving the air compressor. This is true, irrespective of whether the power output turbine 20 is being driven at full capacity, partial capacity, idling, or is standing still owing to and depending upon the adjustment of bypass valves 81a, 81b. If the latter valves are fully open then the flow taking place through the power turbine is ineffective to drive the turbine. However, irrespective of the position of the valves the only inlet to the engine is by way of air compressor inlet 49 and the sole outlet from the engine is by way of the turbine driving the compressor. Furthermore, and of very considerable importance is the fact that the overall operating efficiency of various components of the engine remains at a very high level in substantially all adjusted positions of valves 81a, 81b owing in large measure to the described circuit through which the gases are constrained to flow, the highly beneficial effects of the reheating principle, and the extremely short detour path (i.e., through ports 80a, 80b) taken by the gases during idling and fractional power requirement operation and while continuing to operate the compressor in a stable manner at high efficiency free of pulsing, surging or the like.

While the particular gas turbine engine herein shown and disclosed in detail is fully capable of attaining the objects and providing the advantages hereinbefore stated, it is to be understood that it is merely illustrative of the present preferred embodiments of the invention and that no limitations are intended to the details of construction or design herein shown other than as defined in the appended claims.

I claim:

1. A unitary self-contained gas turbine engine assembly comprising, a compressor turbine, a compressor adjacent one end of said main housing and a power turbine adjacent the other end of said main housing, heat exchange means, a plurality of combustion chambers including first and second combustion chambers in heat exchange relation and connected to convey air from said compressor through said heat exchange means and through each of said combustion chambers and through said power turbine and said compressor turbine before exhausting to the atmosphere through said heat exchange means, regulatable means for supplying fuel to each of said combustion chambers, regulatable bypass means enclosed within said main housing and interconnecting said combustion chambers on the upstream side of said compressor turbine and including operating means therefor extending to and operable from the exterior of said main housing, the air flow passage through said combustion chambers being continuously fully open and free of means other than said bypass means for changing the flow rate therealong, and said regulatable bypass means having a flow capacity substantially the same as the flow capacity of said compressor turbine and being adjustable and effective by itself and independently of the adjustment of said regulatable fuel supply means to operate said power turbine at any desired load output between full-load and no-load by varying the quantity of gas bypassed around said power turbine and directly to said second combustion chamber.

2. The combination defined in claim 1, characterized in the provision of a combined flame holder and wick device located in each of said combustion chamber means, said regulatable fuel supply means including means for supplying liquid fuel to each of said wick devices under pressure for conversion into vapor, baffle means projecting laterally from the downstream end of said wick device and located in the path of air sweeping over upstream portions of said wick device and effective to hold portions of the combustion action to a zone in close proximity to said baffle means.

3. A gas turbine engine assembly as defined in claim 1 characterized in that said regulatable fuel supply means includes separate regulatable fuel supplies to each of said combustion chambers and operable to supply variable quantities of fuel to said first and second combustion chambers, said first and second chambers being in heat exchange relation and either of said combustion chambers being operable under engine idling conditions to supply the hot gas needs of said compressor turbine and to maintain the other of said combustion chambers heated in readiness to resume operation of said power turbine immediately that said regulatable bypass means is opened.

4. A gas turbine engine assembly as defined in claim 3 characterized in the provision in said first and second combustion chambers of vapor generating high temperature wick means having a multiplicity of minute passages therein for the capillary distribution of liquid fuel, and means connecting said separate fuel supplies to said wick means.

5. A gas turbine engine assembly as defined in claim 1, characterized in that said regulatable bypass means includes regulatable means positioned to bleed said compressed air into said second combustion chamber substantially free of fuel and products of combustion.

6. A gas turbine engine assembly as defined in claim 1, characterized in the provision of adjustable but normally pre-set trimmer port means operable independently of said regulatable bypass means and located interiorly of said housing between a high pressure portion of said engine in communication with the discharge of said compressor and a lower pressure internal portion of the gas flow path through said engine and effective to bleed away sufficient compressed air to stabilize the operation of said turbo compressor and avoid surging of the air flow through the compressor portion thereof.

7. A gas turbine engine assembly as defined in claim 6 characterized in the provision of manually actuated adjusting means connected to said trimmer port means and operable from the exterior of said housing.

8. A gas turbine engine as defined in claim 1 characterized in that said first and second combustion chambers are in heat exchange relation to one another, burner means in said second combustion chamber, and means for feeding fuel to said burner means during engine starting and engine idling operation to provide heat to operate said compressor turbine and to maintain said first combustion chamber warm and in readiness to supply hot gases to said power turbine promptly there is a demand for power therefrom.

9. In a gas turbine engine assembly of the type having power output turbine means, combustion chamber means for supplying hot pressurized combustion products to said turbine means, turbo-compressor means for supplying pressurized combustion air to said combustion chamber means and arranged to be driven by pressurized hot gas from said combustion chamber means, that improvement which comprises trimmer means adjustable at the time of initial operation and thereafter normally remaining in a fixed adjusted partially open position and effective to bypass a portion of the pressurized hot combustion products around said power turbine means while the latter remains under power output operation and into hot pressurized gases en route to drive said turbo-compressor means without any material loss of energy to the ambient atmosphere, whereby said pressurized hot combustion products so bypassed are utilized in driving said compressor, in reducing the back pressure on the discharge end of said compressor, and in maintaining efficient non-surging stable operating conditions in said compressor.

10. A self-contained gas turbine engine comprising an air compressor, a primary combustion chamber, a power turbine, a secondary combustion chamber and a second turbine connected to drive said compressor and all continuously connected in a full non-variable series gas flow circuit with one another under wide range operating conditions, means for supplying liquid fuel to both of said combustion chambers and to fuel vaporizing means supported near the gas inlet end of each of said combustion chambers, and normally closed regulatable bypass means interposed between the air inlet to said primary combustion chamber and the downstream end portion of said secondary combustion chamber and effective to bleed variable quantities of relatively cold air en route to the combustion zone of said primary combustion chamber into the secondary combustion chamber to throttle the gases flowing through said power turbine and to vary the power output of said power turbine without varying the cross sectional flow area of said series gas circuit through said engine.

11. A gas turbine engine assembly comprising turbine means driving an air compressor; a power output turbine; combustion chamber means interconnecting said air compressor, power turbine, and the turbine means for said compressor in a continuously open gas circuit and effective to heat the air compressed by said compressor while en route to said turbines; and normally closed bypass part means interconnecting portions of said continuously open gas circuit between points on the opposite sides of said power turbine, said bypass port means being operable independently of the fuel supply to said combustion chamber means and having a gas flow area when open not substantially different than the total area of the gas inlet area of the turbine driving said compressor and effective in the different adjusted positions thereof to vary the pressure differential across said power turbine to vary the power output thereof throughout the full range between full load and no load output.

12. A gas turbine engine assembly as defined in claim 11 characterized in that said combustion chamber means includes first combustion chamber means located between said compressor and said power turbine and second combustion chamber means located between said power turbine and the turbine driving said compressor.

13. A gas turbine engine assembly as defined in claim 12 characterized in that said first and second combustion chamber means are in heat exchange relation with one another.

14. A gas turbine engine assembly as defined in claim 13 characterized in the provision of separately regulatable fuel supplies for each of said first and second combustion chamber means, operator-regulatable means for adjusting the flow area of said by-pass port means between fully-closed and fully-open positions, and either of said first and second combustion chamber means being effective to operate said engine under idle conditions and to maintain the other of said combustion chamber means preheated and in condition to resume operation to burn fuel and to further heat compressed air supplied by said compressor.

15. A gas turbine engine assembly as defined in claim 14 characterized in that said compressor turbine is operable by hot gas supplied from fuel admitted to either of said first and second combustion chamber means.

16. A gas turbine engine assembly as defined in claim 12 characterized in that said bypass port means is located between the downstream end of said first combustion chamber means and the upstream end of said second combustion chamber means.

17. A gas turbine engine assembly as defined in claim 12 characterized in that said bypass port means is located between the upstream end of said first combustion chamber means and the downstream end of said second combustion chamber means and effective when open to deactivate said gas turbine engine rapidly by supplying relatively cold compressed gas directly to the inlet of the turbine driving the compressor.

18. A gas turbine engine assembly as defined in claim 12 characterized in that said bypass port means includes a plurality of separately regulatable port means interconnecting said first and second combustion chamber means adjacent their opposite ends, one of said bypass port means being operable to convey relatively hot gas into the upstream end of said second combustion chamber means and the other being operable to convey relatively cool air substantially free of fuel into the downstream end of said second combustion chamber means.

19. A gas engine turbine assembly as defined in claim 12 characterized in the provision of adjustable anti-surge trimmer means operable to prevent surging of said compressor and comprising bleeder port means connected between said first and second combustion chamber means upstream from the inlet to said compressor driving turbine and effective to bleed hot compressed air around said power turbine and into pressurized gas flowing toward the turbine driving said compressor for use in driving said compressor.

20. A gas turbine engine assembly as defined in claim 11 characterized in that said bypass port means comprises a gas flow passage having an axial flow length less than the width thereof transversely of the flow path.

21. A gas turbine engine assembly as defined in claim 12 characterized in that said first and second combustion chamber means are arranged concentrically of one another and separately by a heat exchange partition.

22. A gas turbine engine assembly as defined in claim 21 characterized in that said bypass port means is located in said heat exchange partition separating said first and second combustion chamber means.

References Cited

UNITED STATES PATENTS

| | | | |
|---|---|---|---|
| 2,473,356 | 6/1949 | Birmann | 60—39.17 |
| 2,557,131 | 6/1951 | Miller | 230—119 X |
| 2,648,492 | 8/1953 | Stalker | 230—119 |
| 2,651,911 | 9/1953 | Sterland | 60—39.17 X |
| 2,654,216 | 10/1953 | Traupel | 60—39.03 |
| 2,654,217 | 10/1953 | Rettaliata | 60—39.17 |
| 2,697,492 | 12/1954 | Destival | 180—66 |
| 2,745,249 | 5/1956 | Sandborn | 60—39.71 X |
| 2,787,886 | 4/1957 | Wood | 60—39.17 |
| 2,858,671 | 11/1958 | Fox | 60—39.25 |
| 2,862,357 | 12/1958 | Hawarth | 60—39.25 |
| 2,879,837 | 3/1959 | Downs | 158—96 |
| 2,912,824 | 11/1959 | Van Nest et al. | 60—39.16 |
| 2,914,918 | 12/1959 | Kaplan | 60—39.17 |
| 2,916,098 | 12/1959 | Millar | 180—66 |
| 2,925,714 | 2/1960 | Cook | 60—39.16 |
| 2,966,944 | 1/1961 | Downs | 158—96 |
| 2,972,230 | 2/1961 | Conklin et al. | 60—39.31 |

FOREIGN PATENTS

| | | |
|---|---|---|
| 927,478 | 9/1955 | Germany. |
| 586,710 | 3/1947 | Great Britain. |

JULIUS E. WEST, *Primary Examiner.*

MARK NEWMAN, *Examiner.*